(12) United States Patent
Kullberg et al.

(10) Patent No.: US 8,986,569 B2
(45) Date of Patent: Mar. 24, 2015

(54) FLEXIBLE MULTI-LAYERED GETTER (75) Inventors: Richard Kullberg, Colorado Springs, CO (US); Tim Armstrong, Colorado Springs, CO (US); Andrea Conte, Milan (IT); Enea Rizzi, Milan (IT)

(73) Assignee: SAES Getters, S.p.A., Lainate (Milan) (IT)

( * ) Notice: Subject to any disclaimer, the term of this patent is extended or adjusted under 35 U.S.C. 154(b) by 1545 days.

(21) Appl. No.: 11/884,640

(22) PCT Filed: Feb. 16, 2006

(86) PCT No.: PCT/US2006/005544
§ 371 (c)(1),
(2), (4) Date: Sep. 29, 2008

(87) PCT Pub. No.: WO2006/089068
PCT Pub. Date: Aug. 24, 2006

(65) Prior Publication Data
US 2009/0215610 A1    Aug. 27, 2009

Related U.S. Application Data

(60) Provisional application No. 60/654,170, filed on Feb. 17, 2005.

(51) Int. Cl.
*H01J 7/18* (2006.01)
*B01J 20/00* (2006.01)
*B22D 5/00* (2006.01)
(Continued)

(52) U.S. Cl.
CPC ............ *F16L 59/08* (2013.01); *C01B 3/0026* (2013.01); *C01B 3/0031* (2013.01); *C01B 3/0084* (2013.01); *C01B 3/505* (2013.01); *F17C 1/00* (2013.01); *F17C 3/08* (2013.01);
*H01J 7/183* (2013.01); *C01B 2203/041* (2013.01); *C01B 2203/048* (2013.01); *F17C 2203/0395* (2013.01); *F17C 2221/01* (2013.01); *F17C 2221/05* (2013.01); *F17C 2223/0123* (2013.01); *F17C 2223/0153* (2013.01); *F17C 2223/0161* (2013.01); *F17C 2223/033* (2013.01); *F17C 2223/035* (2013.01); *Y02E 60/327* (2013.01)
USPC ................. 252/181.1; 252/181.6; 502/400; 428/544; 428/546; 96/154

(58) Field of Classification Search
None
See application file for complete search history.

(56) References Cited

U.S. PATENT DOCUMENTS 2,773,561 A  *  12/1956  Hunter ........................... 95/56
3,285,687 A  *  11/1966  Stout ............................. 445/70
(Continued)

FOREIGN PATENT DOCUMENTS

EP          0 837 502 A2      4/1998

OTHER PUBLICATIONS

Benvenuti, C., et al., "Vacuum Properties of Palladium Thin Film Coatings" Vacuum, Pergamon Press, GB, vol. 73, No. 2, Mar. 19, 2004, pp. 139-144, XP002327155, ISSN: 0042-207X.

*Primary Examiner* — Melvin C Mayes
*Assistant Examiner* — Sheng H Davis
(74) *Attorney, Agent, or Firm* — TIPS Group (57) ABSTRACT

A flexible multi-layer getter with a gas-permeable layer covering a gas reservoir layer. In an embodiment, the gas-permeable layer covers part of the gas reservoir layer. In another embodiment, a barrier covers part of the gas reservoir layer. The barrier may include a foil substrate, a passivation layer, or a gas-permeable layer.

15 Claims, 7 Drawing Sheets

(51) Int. Cl.
*B22F 3/00* (2006.01)
*B01D 53/02* (2006.01)
*F16L 59/08* (2006.01)
*C01B 3/00* (2006.01)
*C01B 3/50* (2006.01)
*F17C 1/00* (2006.01)
*F17C 3/08* (2006.01)

(56) References Cited

U.S. PATENT DOCUMENTS

| | | | |
|---|---|---|---|
| 3,953,755 A * | 4/1976 | Kuus et al. | 313/561 |
| 4,430,537 A * | 2/1984 | Sauer et al. | 200/302.1 |
| 4,468,235 A * | 8/1984 | Hill | 95/46 |
| 4,528,003 A | 7/1985 | Dittrich et al. | |
| 4,548,258 A * | 10/1985 | Nelson et al. | 165/104.21 |
| 4,827,188 A * | 5/1989 | Hurst | 313/559 |
| 5,654,084 A * | 8/1997 | Egert | 428/215 |
| 5,861,665 A | 1/1999 | Derkits et al. | |
| 5,895,519 A * | 4/1999 | Lorimer | 95/56 |
| 6,110,808 A | 8/2000 | Saito | |
| 6,423,575 B1 * | 7/2002 | Tran et al. | 438/115 |
| 6,426,380 B1 * | 7/2002 | Bovensiepen et al. | 524/398 |
| 6,428,612 B1 * | 8/2002 | McPhilmy et al. | 96/132 |
| 6,512,256 B1 * | 1/2003 | Cuchiaro et al. | 257/295 |
| 6,554,970 B1 | 4/2003 | Benvenuti | |
| 6,559,596 B1 * | 5/2003 | Arai et al. | 313/553 |
| 7,413,814 B2 * | 8/2008 | Conte et al. | 428/613 |
| 2003/0062610 A1 | 4/2003 | Kovacs et al. | |
| 2004/0106001 A1 * | 6/2004 | Kovacs et al. | 428/670 |
| 2005/0238803 A1 * | 10/2005 | Tremel et al. | 427/180 |
| 2007/0052108 A1 * | 3/2007 | McKinnell et al. | 257/777 |
| 2011/0168436 A1 * | 7/2011 | Simpson | 174/257 |

* cited by examiner

FLEXIBLE MULTI-LAYERED GETTER

BACKGROUND

Exemplary embodiments of the invention relate to getters for sorbing gasses, and in particular to composite material getters. Other exemplary embodiments relate to methods for production of same.

In many technologically advanced applications gas sorption is achieved with non-evaporable getter (NEG) materials. NEG materials are frequently found in two types of applications. In a first type of application a NEG material is used to purify a gas stream by sorbing unwanted species. For example, in the semiconductor industry bothersome species such as hydrogen, oxygen, nitrogen, water, oxides of carbon, and oxides of nitrogen can be removed from noble gas streams utilizing NEG materials. Similarly, gasses used in the manufacture of certain gas-filled devices such as light bulbs are purified to provide advantages such as improve filament lifetimes.

In a second type of application a NEG material is used to maintain a high degree of vacuum within a sealed enclosure. Processing chambers are common examples of such enclosures in the semiconductor industry. Such enclosures can also be found, for example, in thermal insulation devices such as thermal bottles, dewars, microelectronic packages, and insulated pipes for oil extraction and for oil transport in arctic and undersea regions. Sealed enclosures for these applications typically include an inner wall and an outer wall with an evacuated volume maintained between the two walls. For oil extraction and transport it is frequently necessary to use insulated pipes in order to prevent excessive cooling of the fluid. Such cooling can cause the heavier components of the oil to solidify with a resulting increase in the total viscosity thereof, potentially creating a blockage.

NEG materials may include metals such as zirconium and titanium and alloys based on these metals and compounds thereof. Such alloys can include one or more other elements selected, for example, from among the transition metals and aluminum, and their oxides. NEG materials have been the subject of several patents. U.S. Pat. No. 3,203,901 describes Zr—Al alloys, and particularly an alloy whose weight percent composition is Zr 84%-Al 16%, produced and sold by SAES Getters S.p.A., Lainate, Italy, under the name St 101®. U.S. Pat. No. 4,071,335 describes Zr—Ni alloys, and particularly an alloy whose weight composition is Zr 75.7%-Ni 24.3%, produced and sold by SAES Getters S.p.A., Lainate, Italy, under the name St 199®. U.S. Pat. No. 4,306,887 describes Zr—Fe alloys, and particularly an alloy whose weight composition is Zr 76.6%-Fe 23.4%, produced and sold by SAES Getters S.p.A., Lainate, Italy, under the name St 198®. U.S. Pat. No. 4,312,669 describes Zr—V—Fe alloys, and particularly an alloy whose weight percent composition is Zr 70%-V 24.6%-Fe 5.4%, produced and sold under the name St 707®. U.S. Pat. No. 4,668,424 describes Zr—Ni-A-M alloys, where A represents one or more rare earth elements, and M represents one or more elements selected from among cobalt, copper, iron, aluminum, tin, titanium, and silicon. U.S. Pat. No. 5,961,750 describes Zr—Co-A alloys, where A is an element selected from among yttrium, lanthanum, the rare earth elements, and mixtures thereof. This patent application particularly discloses an alloy whose weight percent composition is Zr 80.8%-Co 14.2%-A 5%, produced and sold by SAES Getters S.p.A., Lainate, Italy, under the name St 787®.

The sorption of gasses by NEG materials appears to occur in two stages. A first stage is the superficial chemisorption of the gaseous species onto the surface of the NEG material, generally accompanied by the dissociation of the species into its constituent atoms. In a second stage the constituent atoms diffuse into the bulk of the NEG material. In the case of hydrogen sorption, as hydrogen atoms spread inside the material they first form solid solutions, even at low temperatures. As the hydrogen concentration increases, hydrides such as $ZrH_2$ are formed. The sorption capacity for hydrogen is high even at low temperatures.

The second stage is different for elements such as oxygen, carbon, and nitrogen. At relatively low temperatures (generally lower than about 300-500° C., according to the type of the NEG material) only superficial chemisorption occurs and surface layers of oxide, carbide or nitride compounds are formed. These layers effectively block bulk diffusion from occurring. At higher temperatures the oxygen, nitrogen, and carbon atoms are able to diffuse into the NEG material, thus regenerating a clean surface for further gas sorption. Therefore, surface cleaning can be achieved continuously by constantly maintaining a NEG material at a sufficiently high temperature. Alternately, the surface of a NEG material maintained at a low temperature can be cleaned by periodically bringing it to a sufficiently high temperature. This latter process is commonly known as an "activation" treatment, and may be carried out at regular intervals or when a loss of sorption capacity is observed.

However, there are many applications for NEG materials where they cannot be heated to create an activation of the materials. Such applications include maintaining high vacuum levels in sealed enclosures like those found in X-ray tubes, field-emission flat panel displays, thermal bottles, dewars, fluorescent lamps, and the insulated pipes used in oil extraction and transport. Another important application of this kind is in batteries, both of the rechargeable kind such as Ni-metal hydride batteries, and of the non rechargeable kind, such as conventional alkaline batteries. As is well known in the art, batteries include an anode, a cathode, and an electrolyte disposed between them, all contained within a casing. Both alkaline and rechargeable batteries, under certain operating conditions, may release hydrogen causing the casing to swell and creating a risk of explosion. The buildup of hydrogen may also occur in air-tight containers, such as munitions and pyrotechnics containers. Due to the presence of hydrogen, it may be extremely dangerous to activate the NEG materials by heat.

In these low-temperature applications the sorption of relatively small quantities of oxygen, nitrogen or carbon produces a passivation layer on the surface of the NEG material, as previously described, which prevents further gas sorption and reduces sorption capacity of the NEG material to a fraction of its theoretical value. Further, the passivation layer blocks hydrogen sorption which, as already explained, would otherwise occur to a high extent even at room temperature.

In some applications that employ NEG materials the presence of hydrogen can be especially harmful. In the case of thermal insulation applications, this is because hydrogen is an excellent thermal conductor. Therefore, hydrogen in an evacuated volume, even in small quantities, notably worsens the thermal insulating property thereof. The presence of hydrogen in the gaseous filling mixture of lamps modifies the discharge conditions, and thus both prevents the lamp from functioning optimally and generally shortens its life. In addition, hydrogen is dangerous because it oxidizes rapidly if exposed to a spark, resulting in an explosion. This is of particular concern when the hydrogen outgases from components that are themselves explosive or inflammable.

The formation of a getter deposit may be accomplished according to several techniques including, by way of example but not limitation, sputtering, evaporation, and deposition onto a support. The sputtering technique deposits films with a thickness from fractions of micrometers (micron, μm) up to some tens of microns. Such films typically have an excellent adhesion to a substrate and are resistant to the loss of particles. With sputtering it is also possible to control (at least within certain limits) the morphology of the deposit, optimizing the same for the expected application. For example, a columnar morphology may show a high specific surface area (surface area per unit of weight of the deposit). Moreover, with this technique it is possible to control with a high precision level even the lateral location of the deposit, ensuring the getter deposit is properly aligned. Due to the advantages of sputtering, it is a preferred technique in many applications. U.S. Pat. Pub. 2004/0253476 describes formation of a multilayer getter structure.

Getter materials may be pressed and sintered in order to form pellets, disks, or other useful shapes. Powders of material may also be deposited onto a generally planar substrate using techniques such as cold rolling or screen-printing. Formation of pellets, the use of containers, and cold lamination are well known in the field of powder metallurgy, and the details of the screen-printing technique as applied to getter materials are described in U.S. Pat. No. 5,882,727.

Getter material is typically treated to clean the surface of the getter material, which can activate the getter material. A getter material, even if it has already been chemically activated, may undergo a further thermal activation. At elevated temperatures, components of a device incorporating the getter tend to release gasses. The activation is usually carried in a chamber that is pumped down to remove these gasses, but in the final stages the getter is enclosed within the device. When the cavity is closed, pumping from outside becomes ineffective. The environment within the device is then controlled by pumping in inert or non-reactive gasses or maintaining a vacuum. From that point, the getter absorbs outgassing from components into the environment.

Activation of getter materials may be inconvenient in certain situations, such as maintenance. Since getters are typically heat-activated, the replacement of getters may be a time-consuming task that involves heating the getter material to a requisite temperature before deploying it. In practically every case, a getter material that does not require activation is more convenient than one that does.

Since getters are often relatively large and bulky, there are ongoing efforts to reduce their size. Still, it is difficult to place some getters into certain environments. For instance, locating getter materials inside or around dewars on, for example, MRI machines may be impossible without retrofitting or redesigning the machines. In some cases, available getters are simply too thick or cannot be spread over an area effectively. Much of the bulk may be from the substrate, which is often ceramic.

Many getter materials particulate over time. It may be undesirable to have pieces of getter material fall off into an environment for functional or even aesthetic reasons. For example, a relatively unsophisticated viewer may feel that a device with a particulating getter is broken or of low quality. Particles of spent material could impact the mechanical or electronic functionality of a device.

Many getters produce water vapour or outgas organics. This may be undesirable in certain situations. Some corrosive organics, such as chlorine and fluorine, are outgassed, potentially causing damage.

Getter materials can be expensive. The cost may be due to an expensive substrate material, and/or the getter material itself. Furthermore, it is typically impossible to cost-effectively recycle materials of the getter because of characteristics of the substrate, such as the relative cost of the substrate compared to the getter material, and the difficulty of removing the getter from the substrate. Since some getters make use of relatively expensive materials, such as palladium, this can be wasteful.

Getter materials can be difficult to transport. This is due to reasons that include the fragility of the getter material, the fragility of the substrates, the reactivity of the getter material, or the bulkiness of the getter or the substrate to which the getter is affixed.

Getter materials may be fragile because they are, for example, brittle, breakable, or susceptible to degradation through environmental or other contamination. After a getter is employed, it may be fragile as well. Such fragility often includes susceptibility to contamination such as dirt, temperature, light, moisture, and other environmental factors.

Getter materials can also be difficult or time-consuming to produce. For example, getter substrates must typically be boiled in multiple solvents before having getter material applied. Getter materials often must be soldered into place to keep them from moving around. Other getter materials are heavy and difficult to deposit where desired.

SUMMARY

In various embodiments, one or more of the above-described problems have been reduced or eliminated.

A multi-layer getter according to an embodiment can be used in a variety of applications. By way of example but not limitation, a multi-layer getter could be used in sealed containers that contain items that outgas hydrogen. In some cases, the items may be adversely affected by water. Advantageously, a multi-layer getter according to an embodiment may getter the outgassed hydrogen without water byproduct. In some cases, it may be desirable to replace or apply the multi-layer getter "in the field". Advantageously, a multi-layer getter according to an embodiment may not require activation.

The above-identified use of a multi-layer getter is just one non-limiting example. A multi-layer getter according to an embodiment may be used in practically any gettering application that has parameters that are at least approximately met by one of various embodiments.

BRIEF DESCRIPTION OF THE DRAWINGS

Embodiments of the invention are illustrated in the figures. However, the embodiments and figures are illustrative rather than limiting; they provide examples of the invention.

In the figures, similar reference numerals may denote similar components.

DETAILED DESCRIPTION

Figure 1:
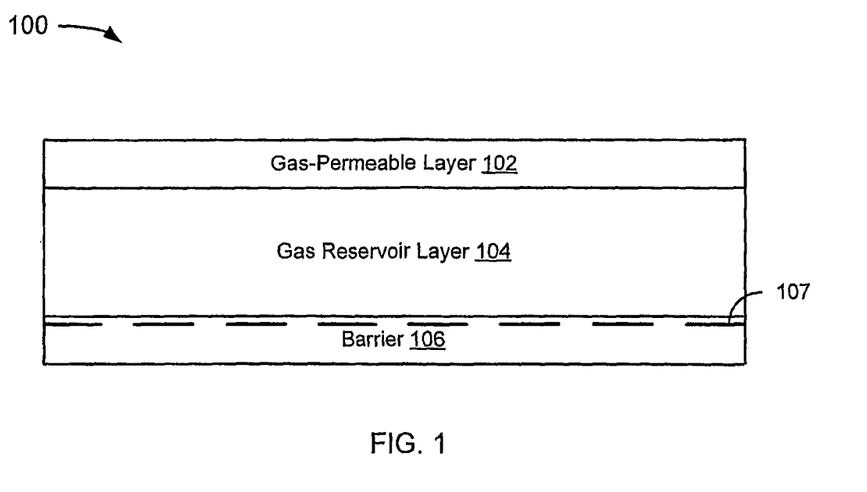
FIG. 1 depicts a flexible getter according to an embodiment.

FIG. 1 depicts a flexible getter 100 (not to scale) according to an exemplary embodiment. The flexible getter 100 includes a gas-permeable layer 102, a gas reservoir layer 104, and a barrier 106.

In the example of FIG. 1, the gas-permeable layer 102 may be, by way of example and not limitation, a palladium coating with a thickness less than about 10 µm, and more preferably less than about 5 µm. Greater thicknesses may slow the rate of hydrogen sorption and consume larger quantities of palladium, which is expensive. In an exemplary embodiment, the gas-permeable layer is between about 0.5 µm and about 2 µm thick. Lesser thicknesses may increase the chances of pinhole defects or decreased durability. A cost/performance analysis can be performed for various applications as will be apparent to those skilled in the art.

In an exemplary embodiment, the gas-permeable layer 102 may include, by way of example and not limitation, a metal such as palladium and compounds of palladium and another material. The palladium may include concentrations of, by way of example and not limitation, tin, gold, boron, lead, silver, or combinations thereof. A palladium silver alloy according to an embodiment may include up to about 30% atomic percent silver.

Additives to the palladium may serve to increase the concentration of, for example, hydrogen at a given gas pressure and temperature that can be adsorbed by the gas-permeable layer 102. It may be noted that the additives increase the solubility of hydrogen because the additives appear to expand the size of interstitial sites within the palladium. However, the additives tend to decrease hydrogen solubility as the interstitial sites are filled. Advantageously, since the gas reservoir layer 104 pumps the hydrogen through the gas-permeable layer 102, the reduced solubility of hydrogen may be a lesser concern in certain embodiments.

Palladium and materials that include palladium are not the only materials that could be used. In general, the gas-permeable layer 102 according to an embodiment should be: catalytic with respect to a target gas, transparent to the target gas, and resistant to blockage. Several materials may include some or all of these properties. Such materials may include by way of example but not limitation iridium, rhodium, ruthenium, titanium, tantalum, platinum, or alloys thereof. Many of the transition metals, particularly group VIII transition metals such as nickel and platinum, adsorb hydrogen spontaneously in a reversible fashion. Moreover, some materials may not normally be catalytic, but can be surface modified to be catalytic. Such materials may be used in the gas-permeable layer 102.

In an exemplary embodiment, the adsorption of a target gas includes breaking target gas molecules into atoms or smaller molecules in a catalytic manner. A molecule of hydrogen ($H_2$) may be broken into its component atoms before being adsorbed by the gas-permeable layer 102. The target gas may be part of a compound or mixture that is first cracked prior to adsorbing the target gas. For example, phosphine ($PH_3$) outgassing occurs with certain munitions. The target gas, in this case, may be referred to alternatively as phosphine or hydrogen. To adsorb the hydrogen, the gas-permeable layer 102 must first crack the phosphine to release the hydrogen.

The breaking of molecules into component atoms or smaller molecules is sometimes referred to as dissociation. Dissociation for, for example, hydrogen may be represented by the formula: $H_2 \Leftrightarrow 2H_{ad}$, where Hd represents adsorbed hydrogen. Or, in the case of phosphine, $PH_3 \Leftrightarrow P+3H_{ad}$. The bi-directional arrow, $\Leftrightarrow$, is used to indicate that, in an embodiment, the reaction may be reversible.

In the case of hydrogen, the dissociated hydrogen atoms may diffuse into a (typically metallic) lattice. Hydrogen that has diffused into the lattice occupies interstitial positions in the lattice. This phenomenon has been demonstrated with neutron diffraction and inferred from other evidence. Metallic lattices are well-known in the metallurgical arts, so a detailed description of metallic lattices is not provided herein.

It may be noted that a lattice that enables atoms or molecules of a target gas to slip through the lattice structure may be referred to as transparent to that target gas. Since hydrogen atoms are very small, the gas-permeable layer 102 is usually at least transparent to hydrogen. Diffusion of the dissociated hydrogen atoms may be represented by the formula: $H_{ad} \Leftrightarrow H_M$, where $H_M$ represents hydrogen in the lattice of the metal (e.g., in a palladium lattice). The gas-permeable layer 102 may or may not be transparent to other gasses in addition to hydrogen.

Atoms or molecules may occupy sites on the surface of the gas-permeable layer 102, or, if the atoms or molecules are small enough, deeper inside the lattice. When the atoms or molecules occupy the surface sites, but do not pass deeper inside, the gas-permeable layer 102 may have reduced gettering capabilities due to a blockage. This may occur when large atoms or molecules are attracted to (and "stick to") the surface of the gas-permeable layer 102, but are too large to pass through.

Another type of blockage, which may be similar to blockage by large atoms or molecules, is corrosion. A material's resistance to corrosion varies depending on the material. Noble metals, such as gold and silver, are known to be corrosion-resistant in many applicable environments, such as air. Iron, on the other hand, while it may be alloyed to make it corrosion-resistant, is not particularly corrosion-resistant in air because of its tendency to oxidize. Palladium is resistant to corrosion (e.g., oxidation) in air.

Certain materials are not particularly resistant to corrosion, though the materials may make excellent getters. By way of example but not limitation, titanium has exceptional gettering capabilities with respect to hydrogen, and can sorb a relatively large quantity of hydrogen, but tends to oxidize in air, forming an oxide surface layer that reduces the gettering capabilities of the titanium. Titanium is used, for example, in titanium sublimation pumps. Since titanium sublimation pumps oxidize relatively rapidly, they are normally employed in a vacuum or oxygen-free atmosphere.

In the example of FIG. 1, the gas reservoir layer 104 is covered, and at least somewhat protected, by the gas-permeable layer 102. The use of the term "covered" in this context refers to the gas-permeable layer 102 substantially coating a surface of the gas reservoir layer 104. Pin-holes do not necessarily substantially degrade gettering capabilities of the getter 100 but, in an embodiment, holes in the gas-permeable layer 102 are avoided. Moreover, the gas-permeable layer 102 may or may not cover an entire surface of the gas reservoir layer 104 or may only cover a surface, leaving edges of the gas reservoir layer 104 uncovered.

The gas reservoir layer 104 may or may not be corrosion-resistant. Indeed, some materials that would be valuable as gas reservoir material, such as titanium, may oxidize in air. The gas reservoir layer 104 may include, for example, a metal such as titanium, zirconium, hafnium, niobium, tantalum, vanadium, or yttrium, or alloys thereof with a transition metal (e.g., titanium, zirconium, chromium, manganese, iron, cobalt, nickel, aluminum, copper, tin, silicon, yttrium, or lanthanum), rare earth elements, or mixtures thereof. Also, compounds of metals and alloys, such as metal oxides, may be employed, as well as non-metallic getter materials and absorbers. Examples include Ti—V alloys, Zr—V alloys, Zr—Al alloys, Zr—Fe alloys, Zr—Ni alloys, Ti—V—Mn alloys, Zr—Mn—Fe alloys, Zr—V—Fe alloys, Zr—Ni-A-M alloys, and Zr—Co-A alloys, where A indicates Y, La, any of the rare earth elements, or mixtures thereof, and M indicates Co, Cu, Fe, Al, Sn, Ti, Si, or mixtures thereof.

In the example of FIG. 1, the gas reservoir layer 104 may be, by way of example and not limitation, a titanium layer with a thickness less than about 20 µm, and more preferably less than about 5 µm. In an embodiment, the gas reservoir layer 104 may be between about 1 µm and 3 µm thick. The gas reservoir layer 104 may be made thinner, but the amount of target that can be trapped within the gas reservoir layer 104 may or may not have a direct mass relationship. Accordingly, if the gas reservoir layer 104 is thin, it may not be able to hold as much, for example, hydrogen. Conversely, if the gas reservoir layer 104 is thicker than a couple of microns, the gas reservoir layer 104 may be able to hold more, for example, hydrogen. Thus, a 0.1 µm thick gas reservoir layer 104, or a 1 mm thick gas reservoir layer 104 are possible in different embodiments. The thickness of the gas reservoir layer 104 may depend upon the getter material used and application parameters.

In an exemplary embodiment, the gas reservoir layer 104 acts as a reservoir for the sorbed target gas (e.g., hydrogen). The amount of hydrogen that can be absorbed by a material is related to a Sievert's law relationship for the material. Since the gas-permeable layer 102 does not need to act as a reservoir, the gas-permeable layer material need not have an excellent Sievert's law relationship. However, the gas reservoir layer 104 should have a relatively high Sievert's law relationship, depending upon the amount of gas that needs to be sorbed in a given application.

Sievert's law establishes how much gas a given material can hold at a given pressure. At moderate pressures, the concentration of, for example, hydrogen dissolved in a solid metal is described by the following formula:

$$c = sp^{1/2}, \text{where}$$

c is the concentration of dissolved hydrogen in equilibrium with gaseous hydrogen at pressure p, and s is the Sievert's parameter. Sievert's law is well-known in the materials sciences, so a detailed discussion of Sievert's law is omitted.

In various embodiments, the gas-permeable layer 102 may be deposited onto the gas reservoir layer 104 by various techniques, including by way of example and not limitation evaporative or sputtering techniques, chemical deposition from the vapor phase, commonly referred to as chemical vapor deposition (CVD), liquid phase impregnation, or roll-coating. As used herein, roll-coating refers to the coating of a roll of flexible substrate with a getter material.

In an exemplary embodiment, the gas reservoir layer 104 may be bonded to the gas-permeable layer 102 such that there are no substantial gaps between them to facilitate the pumping of a target gas through the gas-permeable layer 102 into the gas reservoir layer 104. While some gaps may exist between the layers, in general, a good bond will result in improved gettering capabilities. This is because the pumping action of the gas reservoir layer 104 can be uniform across the gas permeable layer 102, with a pumping force acting perpendicular to the surface of the gas permeable layer 102 for substantially the entire surface. In some cases, gaps or material deposits could be placed between the gas reservoir layer 104 and the gas-permeable layer 102, possibly degrading gettering capabilities, but providing other benefits.

In an exemplary embodiment, the gas reservoir layer 104 may have a higher associated Sievert's parameter than the gas-permeable layer 102. Accordingly, by example but not limitation, hydrogen atoms that diffuse into the gas-permeable layer 102, which is transparent to hydrogen, are drawn through the gas-permeable layer 102 to the gas reservoir layer 104, thereby moving the system toward equilibrium. It should be noted that in the case of hydrogen, air has a very low partial pressure of hydrogen. Accordingly, the getter 100 could be left in air for a long period before it would lose its gettering capabilities. For the purposes of this specification, a getter 100 that retains its gettering capabilities for a long period of time in air is referred to as substantially inactive in air. In various applications, the "long period" could be measured in hours, days, months, or years.

In an exemplary embodiment, the gas reservoir layer 104 acts as a reservoir for a target gas, but is protected from adverse effects from other gasses or environmental factors by the gas-permeable layer 102. If the reservoir is full, then the reservoir and the ambient environment may be at equilibrium. However, if the reservoir is not full, then atoms or molecules of the target gas that become trapped in the gas-permeable layer 102 will have a tendency to be pumped into and trapped inside the reservoir.

A composite material getter using powder grains is described in U.S. Pat. No. 6,682,817 (the '817 patent). In the '817 patent, a palladium layer partially covers the powder grains. The '817 patent also describes the columnar morphology used to increase the surface area of a getter.

In an exemplary embodiment, the gas reservoir layer 104 is monolithic. A monolithic gas reservoir layer 104 according to an embodiment, would not normally be referred to as comprising particles, nor would the monolithic gas reservoir layer 104 be referred to as having a columnar morphology. This may reduce the probability that rough handling will cause particles to break free or that the material will particulate with use. A monolithic gas reservoir layer 104, which, in an embodiment, is only substantially monolithic, can be bonded to the gas-permeable layer 102 with substantially no gaps. The gas reservoir layer 104 need not rely upon greater surface area, such as that provided by a columnar morphology, to capture molecules, since the gas-permeable layer 102 covers the monolithic gas reservoir layer 104, acting as a gas-permeable barrier between the gas-reservoir layer 104 and the target gas. The gas reservoir layer 104 may be formed using any of a number of different techniques, including by way of example and not limitation evaporative or sputtering techniques, CVD, liquid phase impregnation, or roll-coating.

The barrier 106 protects the gas reservoir layer 104 on the side opposite from the gas-permeable layer 102. It should be noted that in an embodiment that does not have clearly defined sides, the barrier 106 may instead be referred to as protecting part of the gas reservoir layer 104 that is not covered by the gas-permeable layer 102. The barrier 106 may, in an embodiment, include a passivation layer 107. The passivation layer 107, as used herein, is a layer that reduces the chemical reactivity of a surface. The passivation layer 107 may include an oxide layer. In an alternative embodiment, the barrier 106 and the passivation layer 107 are one in the same.

Figure 2:
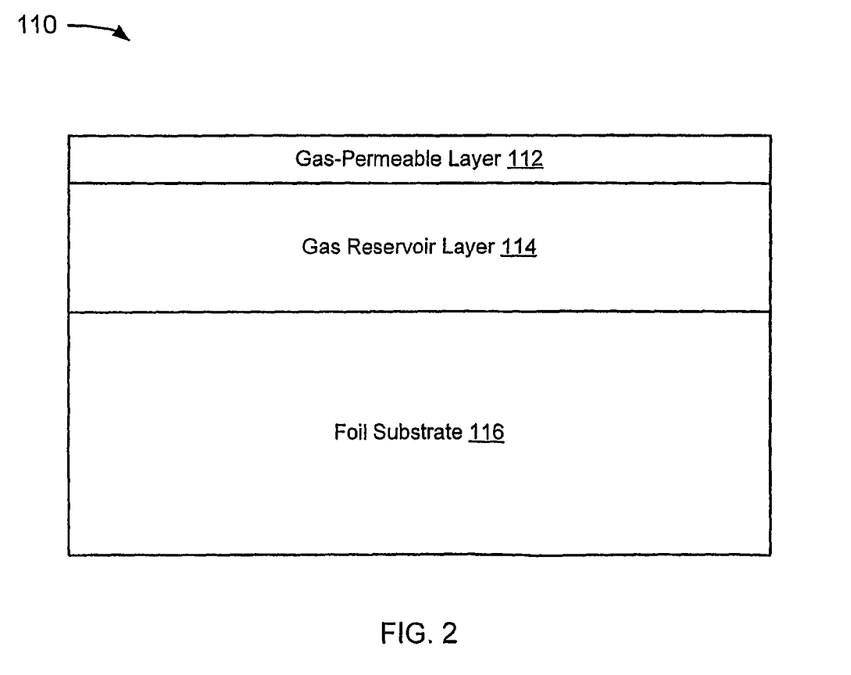
FIG. 2 depicts a getter with a foil substrate according to an embodiment.

In another embodiment, the barrier 106 may include a flexible substrate, such as a foil (see, e.g., FIG. 2). In this embodiment, the passivation layer 107 may or may not be omitted. For example, if the flexible substrate protects the gas reservoir layer 104, then the passivation layer 107 will not necessarily be formed. In yet another embodiment, the barrier 106 could be gas-permeable layer, similar to or the same as the gas-permeable layer 102 (see, e.g., FIG. 4).

Passivation layers are well-known in the art of materials science, so a detailed description is not provided herein, except to indicate that the barrier 106 may be created through controlled passivation on the surface of the gas reservoir layer 104 opposite the gas-permeable layer 102. The barrier 106 may comprise material of the gas reservoir layer 104 (e.g., titanium) that has reacted with, for example, oxygen to create an oxide layer (e.g., titanium oxide). The preferred barrier material may differ depending upon what the gas reservoir layer 104 is made of, but an oxide barrier would be an appropriate barrier for many getter materials.

If the barrier 106 comprises a passivation layer, such as an oxide barrier, then scratching the barrier 106 may result in a degradation to the gettering capabilities of the gas reservoir layer 104, since the scratch may expose the gas reservoir layer 104 to the ambient atmosphere. Fortunately, the barrier 106 is at least partially self-healing in many environments. By way of example but not limitation, if the gas reservoir layer 104 comprises titanium, the surface exposed by a scratch the penetrates the barrier 106 may be oxidized relatively rapidly in air.

In an exemplary embodiment, a multi-layer getter, including the gas-permeable layer 102 covering the gas reservoir layer 104, has an additional advantage in that—at least until the gas reservoir layer 104 is full—the gas-permeable layer 102 does not act as a reservoir for the target gas. This is because the target gas is transient within the gas-permeable layer 102 as the target gas passes through to the gas reservoir layer 104. As is known in materials science, adsorbed, for example, hydrogen can change the characteristics of a getter material, often making the material particulate or suffer other changes from the mechanical stress associated with having hydrogen at interstitial sites. A characteristic change in getters that adsorb hydrogen is brittleness.

Advantageously, since a target gas is transient within the gas-permeable layer 102, the gas-permeable layer 102 does not suffer significant degradations from the adsorption of, for example, hydrogen. Since the hydrogen is located at the interstitial sites of the gas reservoir layer 104, the gas-permeable layer 102 substantially retains its resiliency as hydrogen is adsorbed by the getter 100. Moreover, in an exemplary embodiment, the barrier 106 does not adsorb a substantial amount of additional gas (or the barrier 106 is itself gas-permeable), so the barrier 106 retains its resiliency as well. While the gas reservoir layer 104 may not necessarily be degraded from the adsorption of a target gas, in the case that degradation occurs, the gas-permeable layer 102 and barrier 106 can provide resiliency and protect against obvious particulation, for example.

It has been shown that hydrogen adsorption changes certain physical properties of, for example, metals. These changed physical properties may include electrical resistance, among others. For many metals, this is believed to be from the electron associated with a hydrogen atom entering the s- and d-bands of the host metal, changing the density at a Fermi surface and causing shifts of energy bands. The Fermi electrons surround the hydrogen atom, effectively creating a neutral atom, though the screening electrons are not in bound states.

Since the target gas is transient within the gas-permeable layer 102, as described previously, the effects on the gas-permeable layer 102 are minimal as the target gas is adsorbed and stored within the gas reservoir layer 104. When the gas reservoir layer 104 becomes full, however, the gas-permeable layer 102 may continue to adsorb the target gas. Utilizing this principle, it may be possible to test a characteristic of the gas-permeable layer 102 to determine whether the getter 100 is full. For example, the electrical resistance of the gas-permeable layer 102 could be measured. If the electrical resistance is higher than a measurement taken when the gas-permeable layer 102 has adsorbed little or no gas, the capacity for gasses of the getter 100 may be exhausted.

Another advantage associated with an embodiment of the invention is derived from the fact that the partial pressure of hydrogen in air is inconsequential. Accordingly, the getter 100 can retain its gettering capabilities for a long time in air. In an environment that has hydrogen contamination, however, the partial pressure of hydrogen will rise and the getter 100 adsorbs hydrogen at a greater rate. Thus, in an embodiment, the getter 100 could be manufactured to be about as easy to handle as a roll of commercially-available aluminum foil (though it may be advisable to keep the getter reasonably free of contaminants).

Another advantage associated with an embodiment of the invention is that the getter 100 can be made without a desiccant. Desiccants make getters absorb moisture, which is common in air. So, these types of getters must be protected from moisture. According to an embodiment, the getter 100 is desiccant-free. For example, palladium is not a desiccant. Accordingly, if the gas-permeable layer 102 comprises, for example, palladium, the getter 100 may be made desiccant-free and resistant to water vapor. This can be of significant advantage in extending the lifetime of the getter 100.

The getter 100 has a two-prong approach to the reduction of moisture. First, the getter 100 removes hydrogen from the ambient atmosphere, making the hydrogen unavailable for bonding with oxygen to form water. Second, the getter 100 does not allow adsorbed hydrogen to combine with oxygen after adsorption, so no water is released as a byproduct. Thus, the getter 100 does not produce water as a byproduct.

In the case of, for example, munitions boxes that contain flares, the flares may outgas hydrogen. However, if a getter adsorbs the hydrogen, then releases water as a byproduct, the flares can be damaged by the moisture. For example, a palladium-oxide getter may be associated with a reaction $PdO+2H \Leftrightarrow Pd+H_2O$. To eliminate the water, such getters may incorporate a desiccant that is mixed in with the, for example, PdO. As previously discussed, a desiccant can reduce the lifespan and durability of a product. Plus there is typically a vapor pressure of water above the desiccant that can cause corrosion or otherwise adversely impact the munitions stored in boxes. Plus, desiccants are often bulky.

In the case of, by way of example and not limitation, dewars and other super-insulated systems, water vapor, which is cryosorbed out in operation, may turn into a vapor when the system is at room temperature. This creates another source of gas to sustain a convection heat loss in the system and a cryogen loss through boil off during system cool-down. Advantageously, in an exemplary embodiment, the getter 100 does not create such a source gas.

Non-water by-products can be equally problematic, or even worse. For example, hot ambient temperatures cause commercially-available getter products to outgas organics, which can be deleterious to electronic devices or munitions. On the other hand, the getter 100, in an exemplary embodiment, does not outgas organics. Since the getter 100 has no harmful byproducts, it may be referred to as byproduct-free.

The getter 100 may be referred to as a multi-layer getter foil if the metallic components are thin and flexible. For example, in an embodiment, the gas reservoir layer 104 may include titanium foil. Many metals may be made into thin, flexible leafs or sheets and described as foils. As a rule, foils can be wadded up or folded and unfolded without substantial harm to the foil's integrity or, in the case of getters, gettering capability.

FIG. 2 depicts a getter 110 with a foil substrate according to an exemplary embodiment. The getter 110 includes a gas-permeable layer 112, a gas reservoir layer 114, and a foil substrate 116. In an embodiment, the gas-permeable layer 112 is similar to the gas-permeable layer 102 (FIG. 1). In an embodiment, the gas reservoir layer 114 is similar to the gas reservoir layer 104 (FIG. 1).

In the example of FIG. 2, the foil substrate 116 may be an Ultra-High Vacuum (UHV) or vacuum-grade aluminum foil. It was discovered that large thin foil substrates are difficult to RF etch prior to deposition of a getter material layer on the foil. This is due to RF power reflectivity issues. In a sense, the foil acts as a large antenna that threatens or acts as a changing load in RF etching systems (or sputtering systems by reflecting too much energy back into the sputtering targets).

It was discovered that a way to eliminating cleaning processes—which may be expensive, time-consuming, or both—using, for example, solvents, acids, or surfactants, was to create adequate electrical contact between the foil substrate 116 and the coating system pallet on which the substrate rests, then perform an RF etch. The contact is basically a physical contact that is not immediately obvious as the solution. The more expensive and rigid materials normally used as substrates typically make excellent physical contact with the pallet because they are generally flat and rigid. Also, foil, when etched, changes shape, creates points that attract or cause catastrophic plasma discharges.

In a process using a rigid and expensive substrate, the RF etch process parameters are a forward power or power put into the etching process of 500 W with a nominal reflected power pushed back into the circuit of 4 W maximum. In an experiment conducted by engineers at SAES Getters USA, Inc., the use of foils raised the reflected power to a bit over 80 W before tripping the breakers that protect the power supplies. A first response by the engineers was to set a software trip point of 80 W to protect the equipment. Catastrophic plasma discharges continued at as low as 60 W reflected power, and would at times concentrate into point sources and then cut across the foil, thereby melting or otherwise destroying the foil.

Eventually, a method was discovered that enabled the engineers to reach a nominal range of reflected power of 30-50 W. The method included increasing physical contact around the edges of the foil. A range that allowed the process to proceed without system shutdown was from 10-61 W. As the method evolved the engineers stabilized the process regularly without excessive labor, time, and cost in the 50-60 W range. This facilitated a rapid etch rate. However the engineers reduced the number of pieces of foil per run as heat build-up in the system caused foil lift off and a return of excessive reflected power in its own right.

In an exemplary embodiment, one way to reduce the reflectivity problem is by maintaining firm physical contact around the edges of the foil. Physical contact around the edges may be accomplished using, by way of example but not limitation, Kapton tape, screws, and stainless steel weights. Other techniques may be used to ensure physical contact sufficient to permit safe RF etching of a foil.

It has been discovered that some foils need not be processed with solvents (e.g., isopropanol, methanol, and xylenol) prior to applying the gas reservoir layer 114. For example, when the layers 112 and 114 were prepared upon a UHV foil without chemically processing the foil prior beforehand, the gettering capabilities of the foil were determined to be substantially the same as when the getter 110 is prepared upon a UHV foil that has been chemically treated.

It has been discovered that some foils need not be preprocessed using evaporative techniques. In alternative embodiments, it may still be desirable to perform chemical substrate processing or employ evaporative pre-processing techniques with certain foils. In any case, the RF etch is an effective technique for pre-processing foils. In an exemplary embodiment, the RF etch is used to remove, for example, organics and oxides from the foil.

Even with good physical contacts, sputtering a first layer of getter material onto a foil substrate can be difficult and labor-intensive. In an exemplary embodiment, the reflectivity problem associated with sputtering is reduced by using thermal evaporation.

As is known in the art of getter production, substrates are typically masked prior to processing with getter material. Advantageously, in an exemplary embodiment, masking is unnecessary when RF etching, depositing the gas reservoir layer 114, or depositing the gas-permeable layer 112 on top of the gas reservoir layer 114.

In an exemplary embodiment, the gas-permeable layer 112 may be deposited on top of the gas reservoir layer 114 immediately after the gas reservoir layer 114 is deposited on the foil substrate 116. Contrary to some prior art teachings, the gas reservoir layer 114 should be monolithic (e.g., not columnar). The surfaces of the gas-permeable layer 112 and the gas reservoir layer 114 should be bonded as tightly together as is practical or cost-effective.

Commercially-available getters are typically at least 0.010" thick. The foil substrate 116, on the other hand, can be very thin. In another embodiment, the getter 110 is thinner than commercially-available getters, or less than about 0.010" thick. Advantageously, the foil substrate 116 can be as thin as 0.0075 µm, the thickness of an ultra-thin metal foil. In an embodiment, the getter 110 is about 0.0015" thick.

In an exemplary embodiment, the getter 110 can be used in dewars. When the getter 110 is rolled up in the interspace of a dewar, the getter 110 can reduce heat transmission by convection (through the gettering function) and by radiation (through shielding by the metal foil substrate 116). Moreover, in an embodiment, the getter 110 can be retrofitted to existing dewar designs without modification of the dewar without any getter activation. In general, these advantages are applicable to applications other than dewars, such as any practicable container or insulating device.

Figure 3:
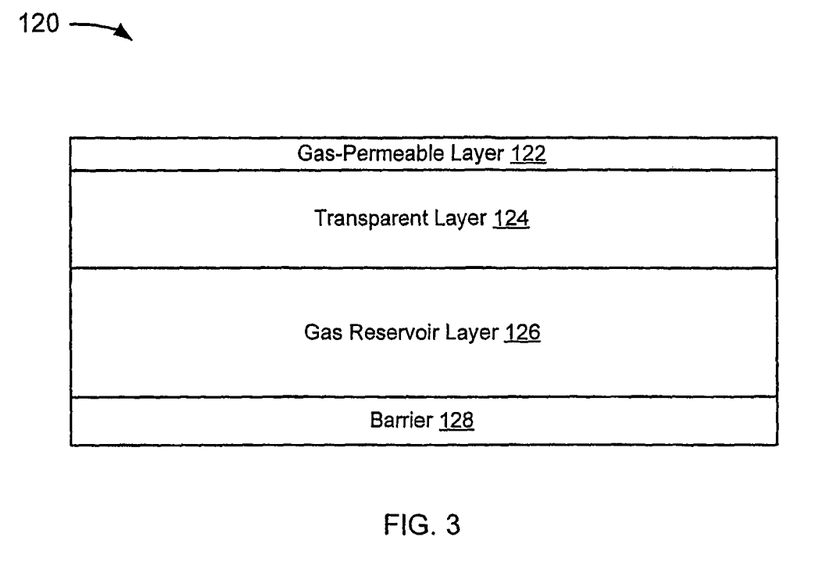
FIG. 3 depicts a three layer getter according to an embodiment.

FIG. 3 depicts a three layer getter 120 according to an exemplary embodiment. The getter 120 may include a gas-permeable layer 122, a transparent layer 124, a gas reservoir layer 126, and a barrier 128. In an embodiment, the gas-permeable layer 122 is similar to the gas-permeable layer 102 (FIG. 1). In another embodiment, the gas reservoir layer 126 is similar to the gas reservoir layer 104 (FIG. 1). The barrier 128 may include, by way of example but not limitation, a passivation layer, a foil substrate, or some other flexible substrate.

In the example of FIG. 3, the transparent layer 124 is transparent to the target gas. One reason for interposing a transparent layer 124 between the gas-permeable layer 122 and the gas reservoir layer 126 may be cost. For example, the gas-permeable layer 122 could be made very thin and the transparent layer 124 interposed between the very thin gas-permeable layer 122 and the gas reservoir layer 126 to cushion or protect the gas reservoir layer 126. Assuming that the gas-permeable layer material is expensive, making the layer thin can result in a lower cost getter 120.

In an exemplary embodiment, the gas-permeable layer 122 may comprise expensive materials (e.g., palladium). When the materials are expensive, it may be desirable to minimize the thickness of the gas-permeable layer 122. In an embodiment, a gas-permeable layer 122 that includes palladium may be only about 1000 Angstroms thick. At thicknesses of less than about 10,000 Angstroms, it is often difficult to remove pinhole defects in, for example, palladium. However, only 1/10 of the palladium need be used in a 1000 Angstrom layer and the transparent layer 124 can protect the gas reservoir layer 126.

Similar to the gas-permeable layer 102 (FIG. 1), it is desirable for the gas-permeable layer 122 to have three characteristics: catalytic with respect to the target gas, transparent to the target gas, and resistant to blockage. The transparent layer 124, on the other hand, need not have catalytic characteristics, since the target gas is already dissociated by the time it reaches the transparent layer 124. Moreover, resistance to blockage may or may not be a concern, depending upon the gasses that the gas-permeable layer 122 allows through to the transparent layer 124. For example, if the gas-permeable layer 122 allows only hydrogen through to the transparent layer 124, the transparent layer 124 need only be transparent to hydrogen and its resistance to blockage due to, for example, oxidation, is irrelevant. Accordingly, the transparent layer 124 may have only one of the characteristics of the previously delineated gas-permeable layer—transparency to the target gas.

In a specific example of an embodiment, the gas-permeable layer 122 includes palladium, the transparent layer 124 includes cobalt, and the gas reservoir layer 126 includes titanium. For the purposes of this specific example, the gas-permeable layer 122 is about 1000 Angstroms thick. It may be noted that the palladium layer is so thin that the cost of materials for the gas-permeable layer 122 may be reduced considerably. Since cobalt is relatively inexpensive, the total cost of the materials can be substantially reduced. For the purposes of this specific example, the transparent layer may be from a few thousand Angstroms to about 5 microns.

Figure 4:
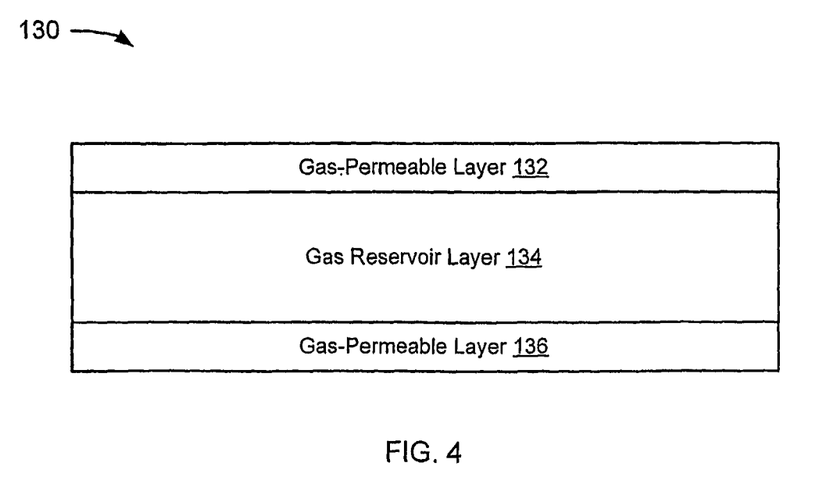
FIG. 4 depicts an alternative three layer getter according to an embodiment.

FIG. 4 depicts an alternative three layer getter 130 according to an exemplary embodiment. The getter 130 may include a gas-permeable layer 132, a gas reservoir layer 134, and a gas-permeable layer 136. In an embodiment, the gas-permeable layer 132 is similar to the gas-permeable layer 102 (FIG. 1). In another embodiment, the gas reservoir layer 134 is similar to the gas reservoir layer 104 (FIG. 1).

In the example of FIG. 4, the gas permeable layer 136 is similar to the gas-permeable layer 102 (FIG. 1). As is shown in FIG. 4, the gas-permeable layers 132, 136 sandwich the gas reservoir layer between them. This configuration may be desirable in certain cases. For example, if oil is spilled on the gas-permeable layer 132 (and the gas-permeable layer 132 would be adversely effected by oil), the gas-permeable layer 136 may still be catalytic and transparent to a target gas. This prevents the contamination of one side of the getter from ruining the gettering capabilities of the getter 130.

To reduce costs, in an alternative embodiment, an additional transparent layer may be interposed between the gas-permeable layer 132, 136 and the gas reservoir layer, in a manner that is similar to that described with reference to FIG. 3.

Figure 5:
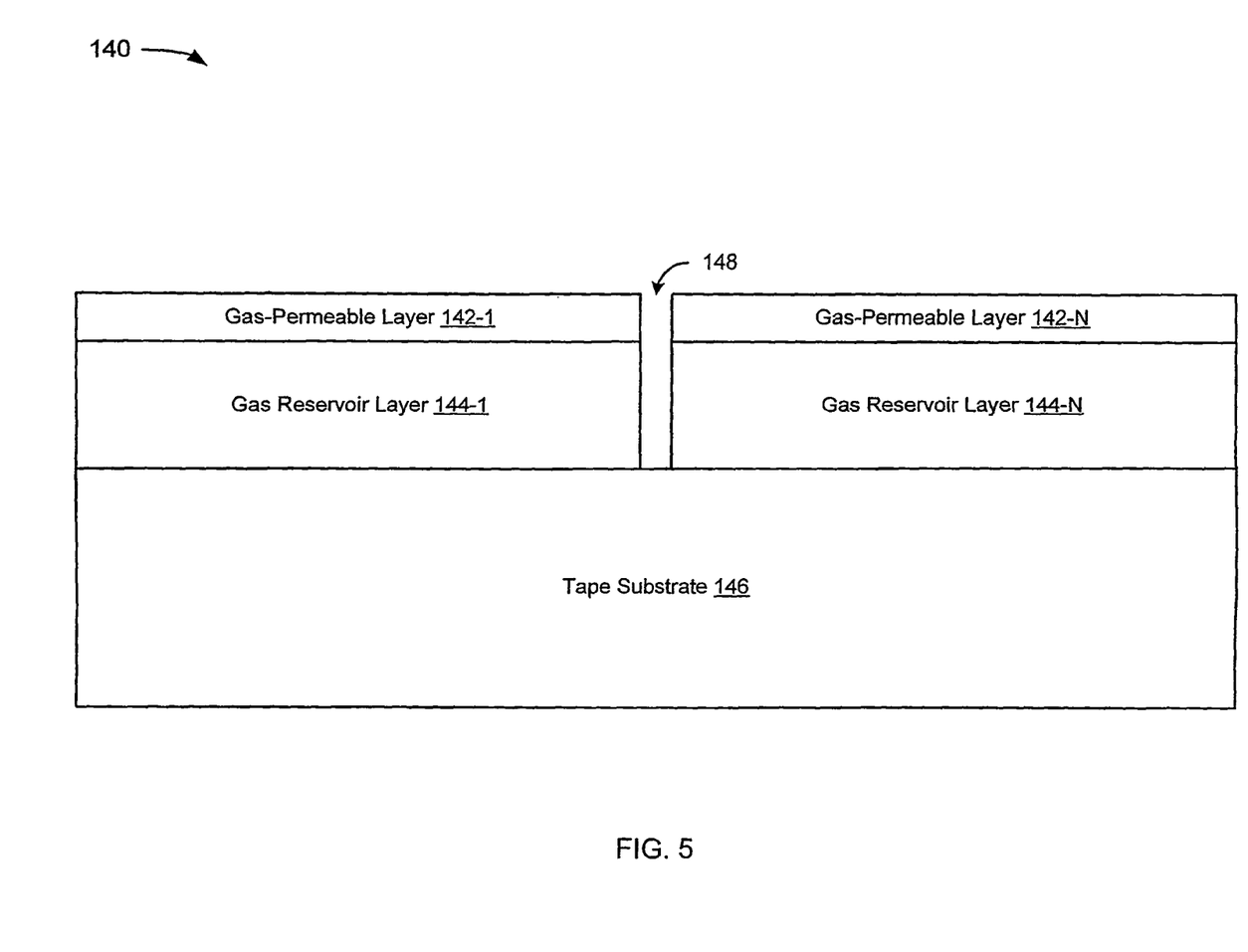
FIG. 5 depicts a getter tape according to an embodiment.

FIG. 5 depicts a getter tape 140 according to an exemplary embodiment. The getter tape 140 may include gas-permeable layers 142-1 to 142-N (referred to hereinafter collectively as gas-permeable layers 142), gas reservoir layers 144-1 to 144-N (referred to hereinafter collectively as gas reservoir layers 144), and a tape substrate 146. In an embodiment, the gas-permeable layers 142 are similar to the gas-permeable layer 102 (FIG. 1). In another embodiment, the gas reservoir layers 144 are similar to the gas reservoir layer 104 (FIG. 1).

In the example of FIG. 5, the tape substrate 146 may include a material that depends upon the intended application of the getter tape 140. For example, if a portion of the getter tape 140 is to be tack-welded onto gold, then the tape substrate 146 may be made of gold. In an embodiment, the gas-permeable layers 142 and the gas reservoir layers 144 may be segmented, leaving a gap 148 between segments. In another embodiment, the gas-permeable layers 142 and the gas reservoir layers 144 may be continuous, leaving no gap 148 between segments. In an alternative embodiment, the tape substrate 146 may include an adhesive.

In an embodiment, the getter tape 140 may be relatively wide and long. For example, the getter tape 140 could resemble a roll of aluminum foil of practically any width or length. Since the getter reservoir layer 144 is protected by the gas-permeable layer 142, the getter material should be durable enough to permit tearing off sheets of the getter material "in the field." A getter on a flexible substrate, such as, for example, the getter 110 (FIG. 2) may be used in a similar manner according to an embodiment.

Figure 6:
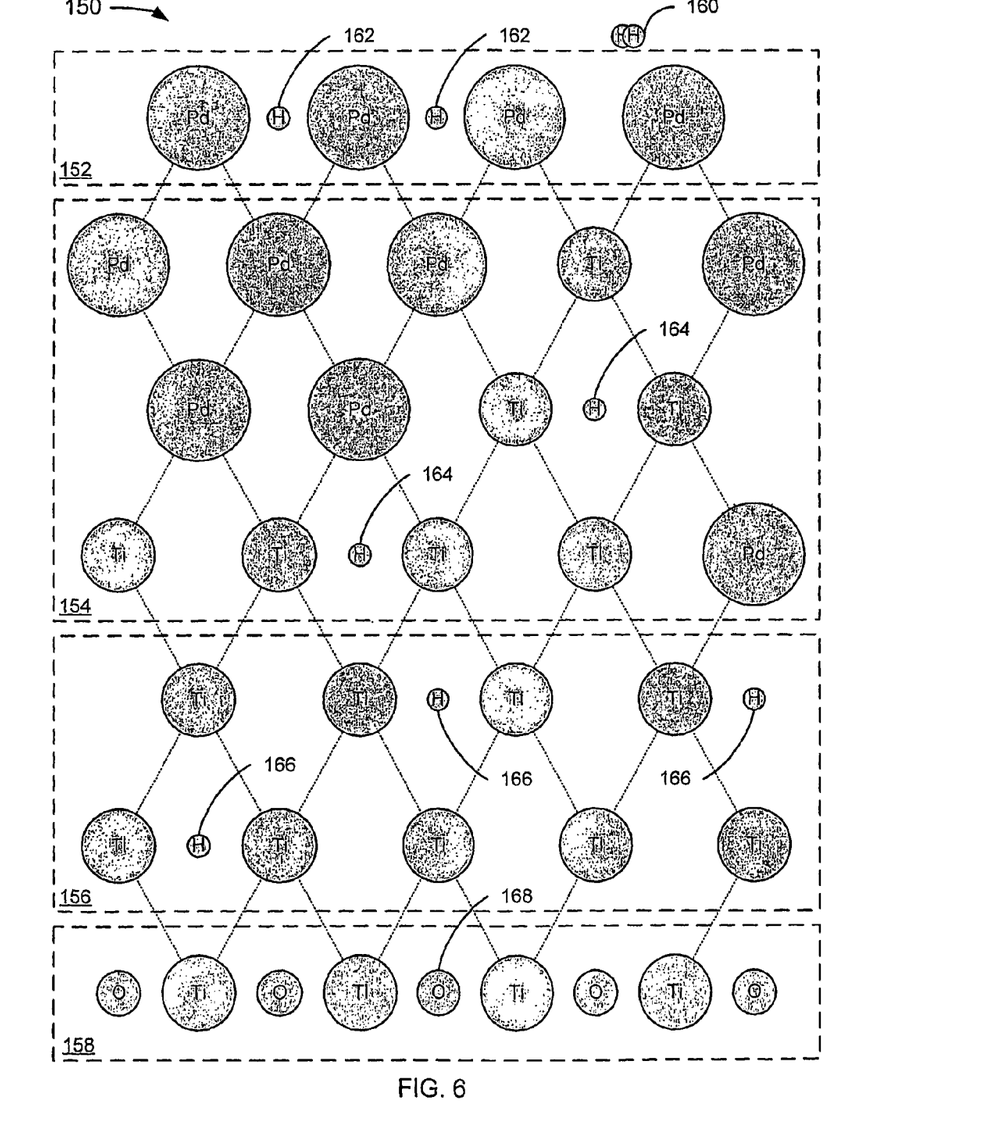
FIG. 6 depicts a conceptual view of a multi-layer getter according to an embodiment.

FIG. 6 depicts a conceptual view of a multi-layer getter 150 according to an exemplary embodiment. In the example of FIG. 6, the multi-layer getter 150 includes a palladium and titanium metallic lattice. The metallic lattice may be logically subdivided into a first section 152, a second section 154, a third section 156, and a fourth section 158. The first section 152 includes a metallic lattice that includes palladium. The second section 154 includes a metallic lattice that includes palladium and titanium. The third section 156 and fourth section 158 include a metallic lattice that includes titanium.

In the example of FIG. 6, a molecule of hydrogen 160 is depicted outside of the metallic lattice. Since palladium is catalytic with respect to hydrogen molecules, the hydrogen molecule 160 may be split into component hydrogen atoms 162 and adsorbed into interstitial sites of the first section 152 of the metallic lattice. Hydrogen adsorbed at the first section 152 may be thought of as a wave-front of hydrogen concentration. In accordance with the principles of equilibrium, the hydrogen disperses into the first section 152, filling closest sites in the process.

Although the hydrogen that disperses into the first section 152 would eventually reach equilibrium if the first section 152 were a closed system, as the hydrogen spreads out in the example of FIG. 6, the hydrogen eventually reaches the second section 154. The interstitial sites of the second section 154, which includes both palladium and titanium are somewhat "larger" than the interstitial sites of palladium alone. The larger interstitial sites of the second section 154 are more attractive to the hydrogen atoms. Accordingly, hydrogen atoms that reach the second section 154 have an increased likelihood of passing out of the first section 152 into the second section 154.

The hydrogen atoms 164 in the second section 154 are unlikely to pass back into the first section 152 because of the greater attractiveness of the larger interstitial sites of the second section 154. When the hydrogen atoms enter the second section 154, they again proceed according to the principles of equilibrium, spreading out within the second section 154.

Eventually, as the hydrogen atoms 164 spread out into the second section 154, the hydrogen atoms 164 reach the third section 156. The interstitial sites of the third section 156 are even more attractive to the hydrogen atoms 164. Accordingly, the hydrogen has an increased likelihood of passing from the second section 154 into the third section 156. The hydrogen atoms 166 are unlikely to pass back into the second section 154 as they spread out to reach equilibrium within the metallic lattice of the third section 156.

The fourth section 158 is a barrier to the hydrogen atoms 166. In the example of FIG. 6, the fourth section 158 includes titanium-oxide (conceptually represented as oxygen atoms 168 trapped within the interstitial sites of the titanium). The fourth section 158 may be thought of as a passivation layer or an oxide layer. In an alternative embodiment, the fourth section 158 could be replaced with some other barrier, such as a foil substrate. Since the fourth section 158 prevents the hydrogen atoms 166 from escaping out of the third section 156 (and the hydrogen is unlikely to pass through the second and first sections), the third section 156 effectively traps the hydrogen atoms 166.

It should be noted that the first, second, and third sections could be thought of as having two layers (the first layer comprising palladium and the second layer comprising titanium). Theoretically, the second layer might not exist, though a perfect division between the, for example, palladium and, for example, titanium layers is exceptionally unlikely in practice.

It should be noted that FIG. 6 is not a realistic depiction of the metallic lattice. The lattices are three-dimensional structures that are rather difficult to represent on paper. However, the lattices of metals are well-known in the art of metallurgy. Accordingly, a realistic depiction of a metallic lattice has been omitted.

Method of Utilizing a Flexible Getter

A flexible getter, examples of which are described above with reference to FIGS. 1-6, can be used in a number of ways. FIGS. 7-11 depict flowcharts of methods according to embodiments.

Figure 7:
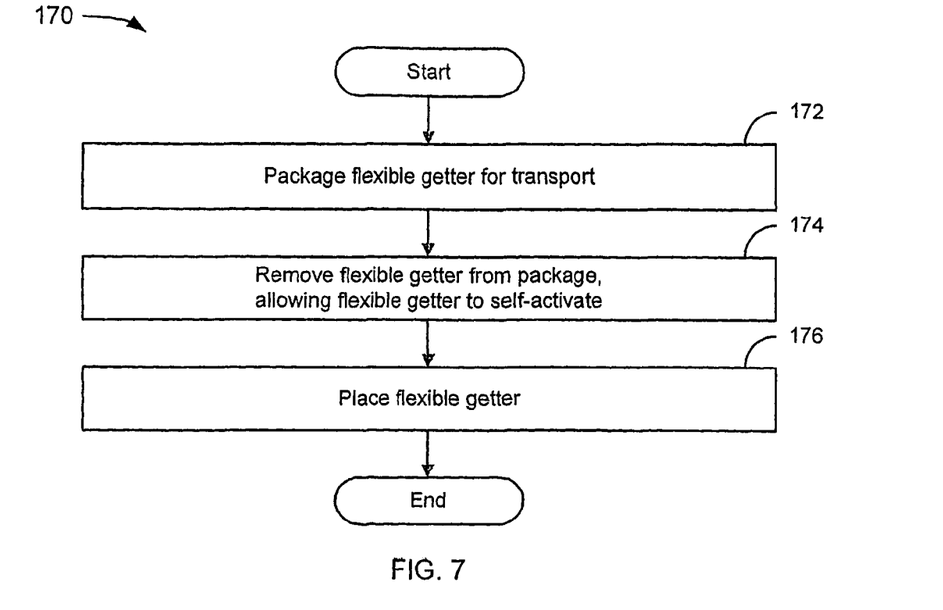
FIGS. 7-11 depict flowcharts of methods according to embodiments.

FIG. 7 depicts a flowchart 170 of a method for deploying a flexible getter according to an exemplary embodiment. In an embodiment, the flowchart 170 starts at module 172 where a flexible getter is packaged for transport. The gas-permeable layer of the flexible getter may make the flexible getter relatively resilient. It may nevertheless be desirable to take some precautions when transporting the getter.

For example, it may be desirable to shrink-wrap or vacuum package the flexible getter. Vacuum packaging is well-known. However, advantageously, the flexible getter can be prepared as a roll (much like a roll of commercially-available aluminum foil). The entire roll can be vacuum packed prior to shipment. Alternatively, by way of example but not limitation, the flexible getter could be packaged in sheets that are shrink-wrapped in a stack, or in air-tight containers.

Unlike typical commercially-available getters, the flexible getters may withstand adverse environmental conditions. Accordingly, even if a package is punctured in transit, the flexible getter is reasonably likely to be useable when received.

In an embodiment, the flowchart 170 continues at module 174, where the flexible getter is removed from the packaging, allowing the flexible getter to self-activate. This may be accomplished by a person or a robot. Since the flexible getter is relatively resilient, extraordinary steps to protect the flexible getter are unnecessary and a normal environment (including oxygen, dust, water vapor, etc.) will probably not adversely impact the performance of the flexible getter. However, it may be desirable to avoid contaminating the surface of the flexible getter. Accordingly, technicians should perhaps wear gloves and keep a work environment relatively free of contaminants, such as motor fuel or lubricants.

Advantageously, in an exemplary embodiment, the flexible getter can be used immediately upon receipt. This is due to the fact that the flexible getter does not require chemical or heat activation. As soon as the packaging, which may be vacuum packaging, is opened, the flexible getter can be deployed. This may be referred to as the "self-activation" functionality of the flexible getter.

In an embodiment, the flowchart 170 continues at module 176, where the flexible getter is placed. Advantageously, in an exemplary embodiment, the flexible getter is relatively thin. In a specific embodiment, the flexible getter may be as thin as commercially available aluminum foil. The thickness of the flexible getter facilitates placement in a number of different places where there is minimal space. The flexible getter can be used, for example, as a sheet or scrunched up into a corner of a container.

Figure 8:
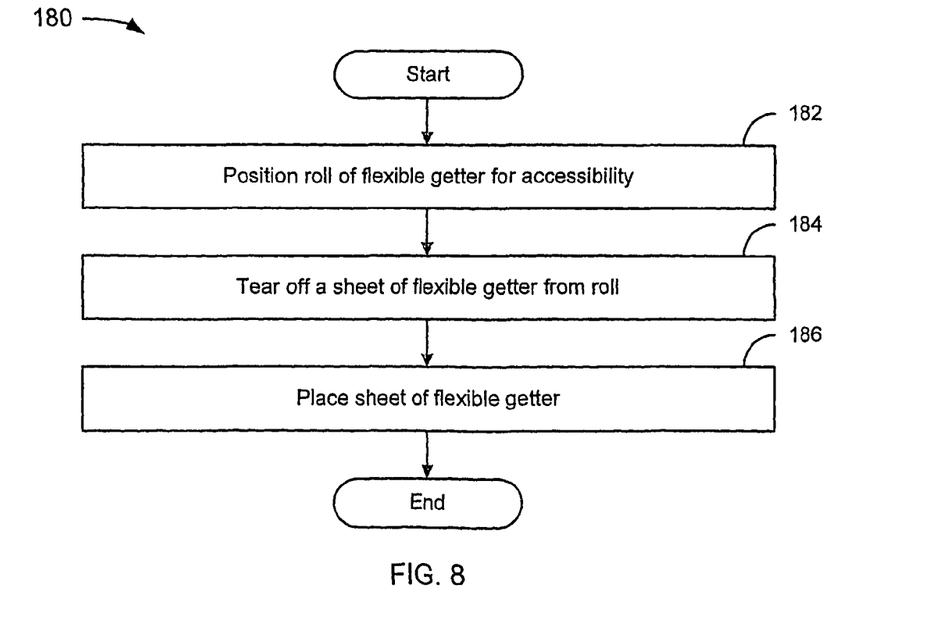

FIG. 8 depicts a flowchart 180 of a method for applying a flexible getter in a work environment according to an exemplary embodiment. In an embodiment, the flowchart 180 starts at module 182 where a roll of the flexible getter is positioned for accessibility.

Advantageously, in an embodiment, the flexible getter is not adversely affected by a normal work environment. Accordingly, the flexible getter can be, by way of example but not limitation, attached to a wall or a desk without extraordinary protective measures. A roll of flexible getter in a normal environment should retain is gettering capabilities for a long time.

In an embodiment, the flowchart 180 continues at module 184 where a sheet of the flexible getter is torn off from the roll. Since the flexible getter can be placed in a convenient location in a work environment, a technician need only tear off a sheet when it is needed. In an exemplary embodiment, no activation is required, resulting in substantial time savings for a technician.

In an embodiment, the flowchart 180 continues at module 186 where the sheet of the flexible getter is placed. Once the flexible getter has been placed, other advantages are apparent. For example, the flexible getter produces no water or organic contaminants. This is of particular merit in applications where moisture can cause damage to components and organic contaminants can corrode components or containers. Accordingly, the flexible getter may be valuable for periodic getter replacements, such as an annual replacement of getter in munitions containers or dewars.

Figure 9:
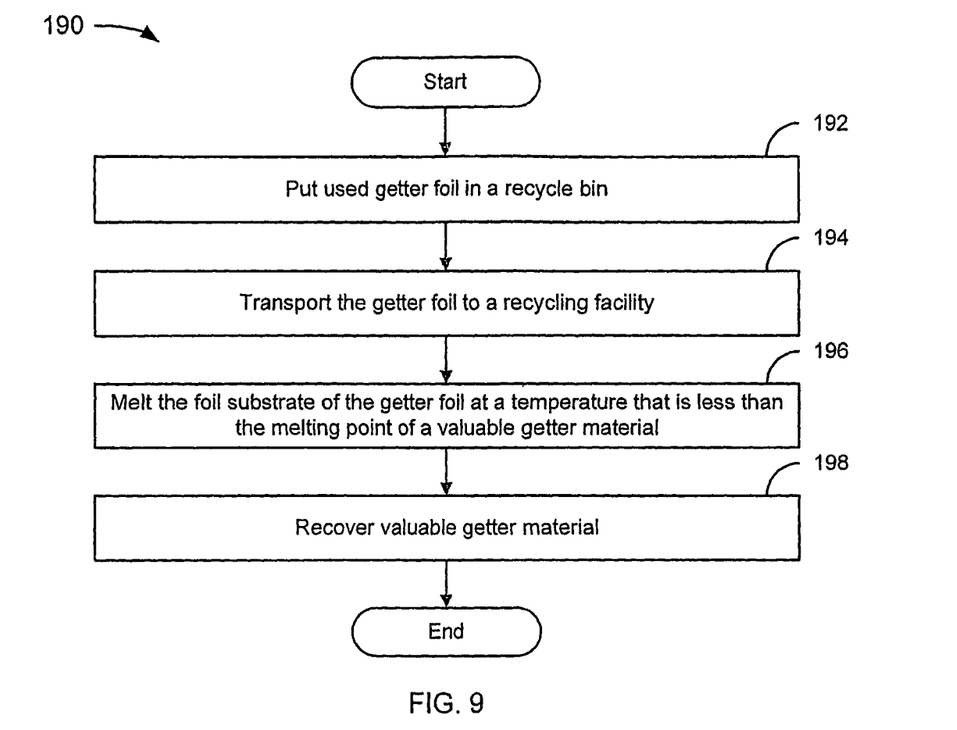

FIG. 9 depicts a flowchart 190 of a method for recycling getter materials according to an exemplary embodiment. In an embodiment, the flowchart 190 starts at module 192 where a multi-layer getter foil is placed in a recycle bin. It may be noted that the flowchart 190 is directed to the recycling of a multi-layer getter foil. However, this method may be even easier to apply to a substrateless getter, since the steps associated with removing the foil substrate can be avoided. For this reason, some of the modules of the flowchart 190 are completely optional. (It should be noted that any module may or may not be optional in alternative embodiments.)

The multi-layer getter foil can be conveniently located in a work environment, as explained above with reference to FIG. 9. It may be just as easy to locate a recycle bin in the same area. Unlike getters with, for example, ceramic substrates, recycling getter foils and substrateless getters may be economically worthwhile.

In an embodiment, the flowchart 190 continues at module 194 where the multi-layer getter foil is transported to a recycling facility. In an exemplary embodiment, foils may be compacted to remove air. Since the foils, in an exemplary embodiment, are non-particulating, the compaction process will be relatively clean and particles should not drop off when the compacted foil is transported to a recycling facility. In an exemplary embodiment, the recycling facility may be located on-site.

In an embodiment, the flowchart 190 continues at module 196 with melting the foil substrate of the multi-layer getter foil at a temperature that is less than the melting point of a valuable getter material. Foil substrates with relatively low melting points, such as aluminum, can be melted, leaving other getter materials as scum on the surface of the liquid substrate material. Getter materials, including by way of example but not limitation palladium and titanium, melt at higher temperatures than, for example, aluminum. If the heat source is on-site, the material that is provided for recycling may be exceptionally light-weight, since, in an embodiment, the foil makes up the vast majority of the mass of the getter foil.

In an embodiment, the flowchart 190 continues at module 198 with recovering the valuable getter material. In an embodiment, if an aluminum substrate is melted, the palladium and titanium can be scooped off of the surface.

In alternative embodiments, the getter material could be recovered in other ways including, by way of example but not limitation, dissolving the getter foil in acid and removing the getter materials electrolytically, as is known in the metallurgical arts. Similarly, after melting the foil substrate, the recovered getter materials may be chemically isolated from one another electrolytically. Alternatively, the getter materials could be heated to the melting point of one of the getter materials (e.g., titanium) leaving only the other getter material (e.g., palladium) for recovery. In any case, the recovery of expensive components, such as palladium, becomes economically feasible because of the relative inexpense of the foil substrate, the relative ease with which the expensive components can be isolated from the less valuable components, or both.

Figure 10:
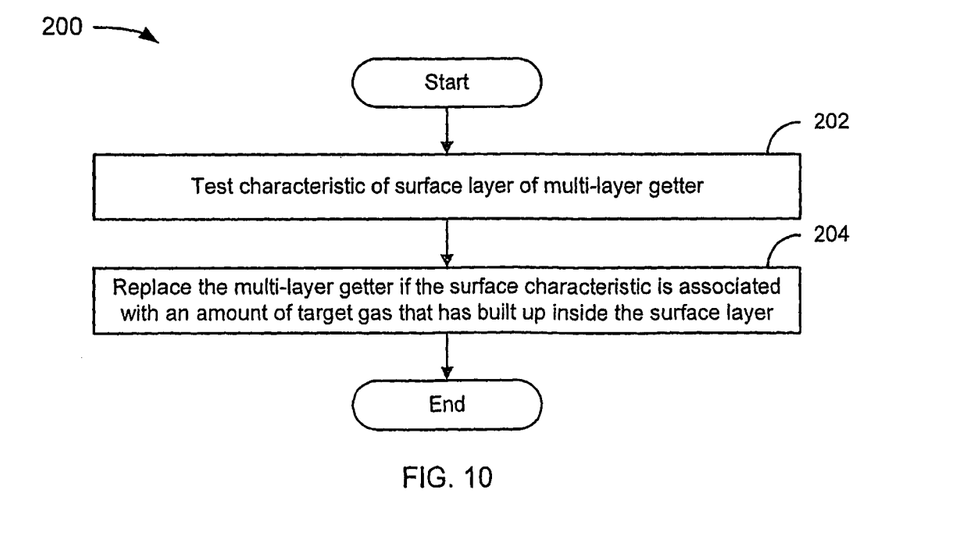

FIG. 10 depicts a flowchart 200 of a method for testing a multi-layer getter according to an exemplary embodiment. In an embodiment, the flowchart 200 starts at module 202 where a surface of a multi-layer getter is tested. The test may measure, by way of example but not limitation, the electrical resistance of the surface layer of the multi-layer getter. It is known that the characteristics, such as electrical resistance, change when a metal adsorbs a target gas. Accordingly, measuring, for example, electrical resistance may show whether the capacity for gasses of the getter may be exhausted.

It may be difficult to test electrical resistance of a multi-layer getter. For example, a multi-layer getter (e.g., the getter 110 of FIG. 2) may be conceptualized as three resistances in parallel. The overall resistance is the sum of the reciprocal of the three resistances. For the purposes of illustration but not limitation, assume a gas-permeable layer 112 of palladium, a gas reservoir layer 114 of titanium, and a foil substrate 116 of aluminum. Since aluminum has a low resistivity and in at least one embodiment will have a greater thickness than the palladium and titanium layers, the contribution of the aluminum may be so much higher that the net result will be that the resistance measured is always that of the aluminum layer.

Advantageously, if the substrate is an insulator (or has a relatively high resistivity), measurement may be possible. For example, a multilayer getter (e.g., the getter 100 of FIG. 1) may be conceptualized as two resistances in parallel (ignoring the presumably low resistivity of the barrier 106). For the purposes of illustration but not limitation, assume a gas-permeable layer 102 of palladium, a gas reservoir layer 104 of titanium, and a barrier 106 of a thin, flexible, insulator.

To further reduce the resistivity of the multilayer getter, the gas-permeable layer may be further isolated. By way of example but not limitation, interdigitation contact patterns could be placed on one or more of the surfaces of the various layers to further detect changes in resistance. In addition, the use of polymer/metal multilayers, such as those used in the production of VIP envelopes, as is known in materials engineering, may further facilitate the measurement of the gas-permeable layer.

In an embodiment, the flowchart 200 continues at module 204 with replacing the multi-layer getter if the surface characteristic is associated with an amount of target gas that has built up inside the surface layer. Advantageously, the surface layer may be gas-permeable and another layer acts as a reservoir. The, for example, electrical resistance of the surface layer will not change substantially until the reservoir is full. Accordingly, the surface characteristic will be associated with an amount of target gas that has built up inside the surface layer when the reservoir is full.

A reservoir, as used herein, refers to a getter that adsorbs a target, such as hydrogen, and does not release the target. This is different from a non-reservoir getter that may release water as a byproduct when the adsorbed hydrogen combines with oxygen.

Figure 11:
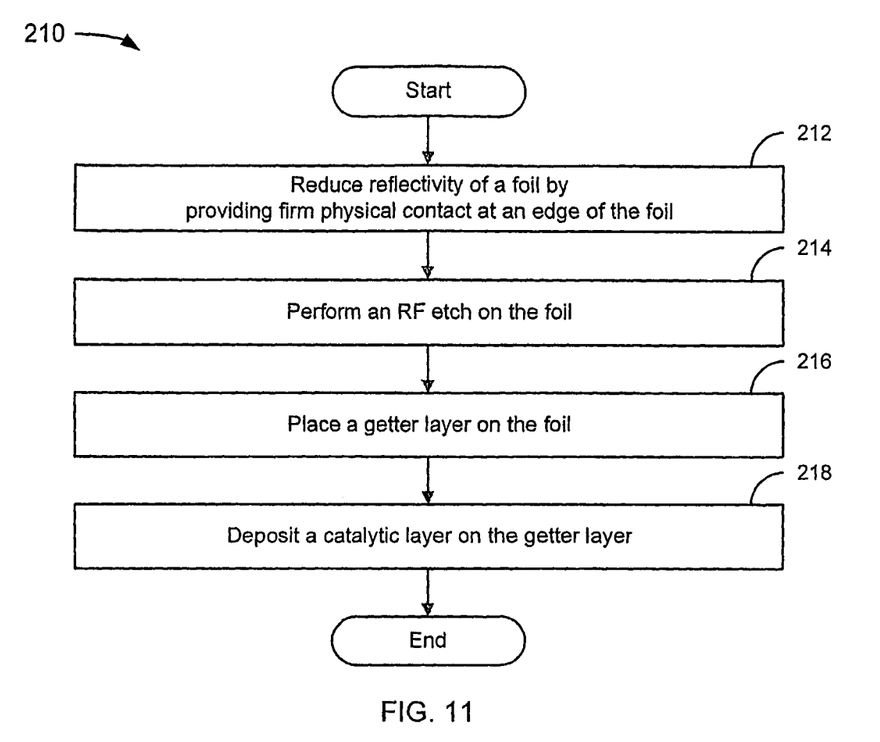

FIG. 11 depicts a flowchart 210 of a method for constructing a getter foil according to an exemplary embodiment. In an embodiment, the flowchart 210 starts at module 212 where reflectivity of a foil is reduced by providing firm physical contact at an edge of the foil. Physical contact around the edge may be accomplished using any of a number of techniques, including by way of example but not limitation, Kapton tape, screws, and stainless steel weights.

In an embodiment, the flowchart 210 continues at module 214 where an RF etch is performed on the foil. It has been discovered that some foils need not be pre-processed through chemical or other means; an RF etch is sufficient. In an embodiment, the RF etch is used to remove, for example, organics and oxides from the foil.

In an embodiment, the flowchart 210 continues at module 216 where a getter layer is placed on the foil. In an embodiment, the flowchart continues at module 218 where a catalytic layer is deposited on the getter layer. The product is a multi-layer getter foil.

The multi-layer getter described herein could be configured in a number of shapes. For example, the core of a multi-layer wire could be a gas reservoir, covered by a gas-permeable layer as described herein. Alternatively, the core of a multi-layer pellet could be a gas reservoir, covered by a gas-permeable layer as described herein.

As used herein, the term "embodiment" means an embodiment that serves to illustrate by way of example but not limitation.

It will be appreciated to those skilled in the art that the preceding examples and preferred embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

What is claimed is:

1. A multi-layer getter foil comprising: a gas reservoir layer comprising titanium having a first surface and a second surface; a gas-permeable layer comprising palladium bonded to the first surface of the gas reservoir layer; and a barrier comprising titanium oxide on the second surface of the gas reservoir layer, whereby the titanium oxide barrier is at least partially self-healing when exposed to an oxygen containing atmosphere.

2. The getter of claim 1 wherein the gas-permeable layer includes an alloy of palladium and an element selected from the group consisting of tin, gold, boron, lead, silver, and combinations thereof.

3. The getter of claim 1 wherein the gas-permeable layer is less than about 10 micrometers thick.

4. The getter of claim 1 wherein the gas reservoir layer is monolithic.

5. The getter of claim 1 wherein the gas reservoir layer includes an alloy of titanium with one or more elements selected from the group consisting of transition metals, Rare Earths, and aluminum.

6. The getter of claim 1 wherein the gas reservoir layer is less than about 20 micrometers thick.

7. The getter of claim 1 wherein the barrier is formed when material at the second surface of the gas reservoir layer chemically reacts with a substance.

8. A multi-layer getter foil comprising:
 a gas reservoir layer comprising titanium having a first surface and a second surface;
 a gas-permeable layer comprising palladium bonded to the first surface of the gas reservoir layer; and
 a barrier comprising titanium oxide on the second surface of the gas reservoir layer, wherein said barrier was formed by exposing the second surface of the gas reservoir to an oxygen containing atmosphere.

9. The getter of claim 8 wherein the gas-permeable layer includes an alloy of palladium and an element selected from the group consisting of tin, gold, boron, lead, silver, and combinations thereof.

10. The getter of claim 8 wherein the gas-permeable layer is less than about 10 micrometers thick.

11. The getter of claim 8 wherein the gas reservoir layer is monolithic.

12. The getter of claim 8 wherein the gas reservoir layer includes an alloy of titanium with one or more elements selected from the group consisting of transition metals, Rare Earths, and aluminum.

13. The getter of claim 8 wherein the gas reservoir layer is less than about 20 micrometers thick.

14. A multi-layer getter foil comprising:
 a gas reservoir layer less than about 20 micrometers thick and having a first surface and a second surface, the gas reservoir layer including an alloy of titanium with one or more elements selected from the group consisting of transition metals, Rare Earths, and aluminum;
 a gas-permeable layer less than about 10 micrometers thick, the gas-permeable layer comprising an alloy of palladium and an element selected from the group consisting of tin, gold, boron, lead, silver, and combinations thereof, said alloy of palladium bonded to the first surface of the gas reservoir layer; and
 a barrier comprising titanium oxide on the second surface of the gas reservoir layer, wherein said barrier was formed by an oxidation of the second surface of the gas reservoir layer.

15. The getter of claim 14 wherein the gas reservoir layer is monolithic.

* * * * *